US008093485B2

(12) United States Patent
Lin

(10) Patent No.: US 8,093,485 B2
(45) Date of Patent: Jan. 10, 2012

(54) METHOD AND SYSTEM FOR PREFETCHING SOUND DATA IN A SOUND PROCESSING SYSTEM

(75) Inventor: David H. Lin, San Jose, CA (US)

(73) Assignee: LSI Corporation, Milpitas, CA (US)

( * ) Notice: Subject to any disclaimer, the term of this patent is extended or adjusted under 35 U.S.C. 154(b) by 1669 days.

(21) Appl. No.: 11/016,040

(22) Filed: Dec. 17, 2004

(65) Prior Publication Data

US 2006/0136228 A1 Jun. 22, 2006

(51) Int. Cl.
*G10H 7/00* (2006.01)
*G06F 15/00* (2006.01)

(52) U.S. Cl. ............... 84/604; 84/602; 704/20; 704/258

(58) Field of Classification Search ..................... 84/604
See application file for complete search history.

(56) References Cited

U.S. PATENT DOCUMENTS 5,714,704 A * 2/1998 Suzuki et al. .................. 84/604
5,901,333 A * 5/1999 Hewitt ............................ 710/52
5,918,302 A * 6/1999 Rinn ............................... 84/604
6,275,899 B1 * 8/2001 Savell et al. .................. 711/118
6,484,254 B1 * 11/2002 Chowdhury et al. ......... 712/216

* cited by examiner

*Primary Examiner* — Elvin G Enad
*Assistant Examiner* — Christopher Uhlir
(74) *Attorney, Agent, or Firm* — Cochran Freund & Young LLC

(57) ABSTRACT

A method and system for prefetching sound data in a sound processor system. The method includes integrating a prefetching function into at least one voice engine by, providing a setup phase, a data processing phase, and a cleanup phase, and prefetching sound data from a memory during the cleanup phase. As a result, the prefetching of sound data is optimized.

2 Claims, 7 Drawing Sheets

100

100

| Frame | 0 | 1 | 2 | 3 | 4 | 5 | 6 | 7 |
|---|---|---|---|---|---|---|---|---|
| 3DVE Sound Block 0 | 0 | 2 | 4 | 1 | 3 | 0 | 2 | 4 |
| 3DVE Sound Block 1 | 1 | 3 | 0 | 2 | 4 | 1 | 3 | 0 |
| 2DVE Sound Block 0 | 16 | 19 | 22 | 17 | 20 | 23 | 18 | 21 |
| 2DVE Sound Block 1 | 17 | 20 | 23 | 18 | 21 | 16 | 19 | 22 |
| 2DVE Sound Block 2 | 18 | 21 | 16 | 19 | 22 | 17 | 20 | 23 |

FIG. 7

METHOD AND SYSTEM FOR PREFETCHING SOUND DATA IN A SOUND PROCESSING SYSTEM

FIELD OF THE INVENTION

The present invention relates to sound processors, and more particularly to prefetching sound data in a sound processing system.

BACKGROUND OF THE INVENTION

Sound processors produce sound by controlling digital data, which is transformed into a voltage by means of a digital-to-analog converter (DAC). This voltage is used to drive a speaker system to create sound. Sound processors that are wave-table-based use sound data from memory as a source and modify that sound by: altering the pitch; controlling the volume over time; transforming the sound through the use of filters; and employing other effects.

Polyphonic sound processors create multiple sounds simultaneously by creating independent sound streams and adding them together. Each separate sound that can be played simultaneously is referred to as a voice, and each voice has its own set of control parameters.

FIG. 1 is a block diagram of a conventional sound system 50. The sound system 50 includes a main processor 52, a memory controller 54, an external memory 56, a sound processor chip 58, a DAC 60, and a speaker system 62. The sound processor chip 58 includes a voice engine 70, which includes a 2D voice engine (2DVE) 72 and a 3D voice engine (3DVE) 74, a prefetch module 76, which includes arbitration logic 78, and a sound data buffer 80.

In operation, generally, the main processor 52 reads from and writes to the sound processor 58, and the memory controller 54 fetches sound data from the external memory 56 and sends the sound data to the sound processor 58. The sound processor 58 outputs processed sound data to the DAC 60. The DAC 60 converts the sound data from digital to analog and then sends the sound data to the speaker system 62.

The 3D voices require about three times the amount of processing as the 2D voices, and both of the 2DVE 72 and the 3DVE 74 operate concurrently. Each voice engine 72 and 74 has a control register that can limit the number of voices to be less than the maximum number. This voice limitation is done for power-saving or cost-saving reasons.

Generally, the sound generated by a sound processor may be processed in frames of sound data, each frame including a fixed number of sound samples, all for a given voice. Frame-based processing is more efficient than processing a voice at a time, because switching voices involves fetching all of the associated control parameters and history of the new voice. A sound processor that does frame-based processing fetches the number of sound samples from memory that is required to generate the number of sound samples in a frame. A problem with fetching sound data from memory is that the sound processor wastes cycles waiting for the sound data to become available.

One conventional solution that aims to make the most efficient use of the sound processor involves prefetching sound data for a voice. In a typical implementation, the prefetch module 76 has the responsibility of prefetching data for the 2DVE 72 and the 3DVE 74.

A problem with this conventional solution is that it has a die size and performance penalty due to the additional hardware required to implement the prefetch module. For instance, the prefetch module 76 requires the arbitration logic 78 to interface with and to monitor the 2DVE 72 and 3DVE 74. The arbitration logic 78 also must monitor the memory controller 54 and the sound data buffers 80. For example, when a given voice engine 72 or 74 requires sound data, the arbitration logic 78 determines which voice engine 72 and/or 74 needs the sound data so that the prefetch module 76 can make memory requests to prefetch the sound data. The arbitration logic 78 then determines which of the buffers 80 are available to store the prefetched sound data. The arbitration logic 78 keeps track of which buffers 80 contain the prefetched sound data so that the prefetch module 76 can send the prefetched sound data to the appropriate voice engine 72 or 74 when needed.

Also, when the memory controller 54 is able to handle another memory request and a sound data buffer 80 is available, the prefetch module 76 makes the memory request to prefetch sound data for the next voice. In addition, the prefetch module 76 must account for the limitation on the number of voices in its prefetching algorithm. Also, when sound data from a memory request has not arrived in time for a voice because of excessive memory/system latency, the prefetch module 76 must tell the requesting voice engine 72 and/or 74 not to process the sound data, and prefetch module 76 must decide how to recover from the error.

Accordingly, what is needed is a more efficient system and method for prefetching sound data in a sound processing system. The system and method should be simple, cost effective and capable of being easily adapted to existing technology. The present invention addresses such a need.

SUMMARY OF THE INVENTION

The present invention provides method and system for prefetching sound data in a sound processor system. The method includes integrating a prefetching function into at least one voice engine by, providing a setup phase, a data processing phase, and a cleanup phase, and prefetching sound data from a memory during the cleanup phase. As a result, the prefetching of sound data is optimized.

BRIEF DESCRIPTION OF THE DRAWINGS

FIG. 7 is a table illustrating an exemplary progression of voices in the sound data buffers of FIG. 5, in accordance with the present invention.

DETAILED DESCRIPTION OF THE INVENTION

The present invention relates to sound processors, and more particularly to prefetching sound data in a sound processing system. The following description is presented to enable one of ordinary skill in the art to make and use the invention, and is provided in the context of a patent application and its requirements. Various modifications to the preferred embodiment and the generic principles and features described herein will be readily apparent to those skilled in the art. Thus, the present invention is not intended to be limited to the embodiment shown, but is to be accorded the widest scope consistent with the principles and features described herein.

The present invention provides a sound processing system that integrates a prefetching function into each of the voice engines instead of having a separate prefetching module that is responsible for the prefetching. This simplifies the prefetching of sound data as well as allows the voice engines to handle recovery from system memory latency errors.

Although the present invention disclosed herein is described in the context of sound processors, the present invention may apply to other types of processors and still remain within the spirit and scope of the present invention.

Figure 1:
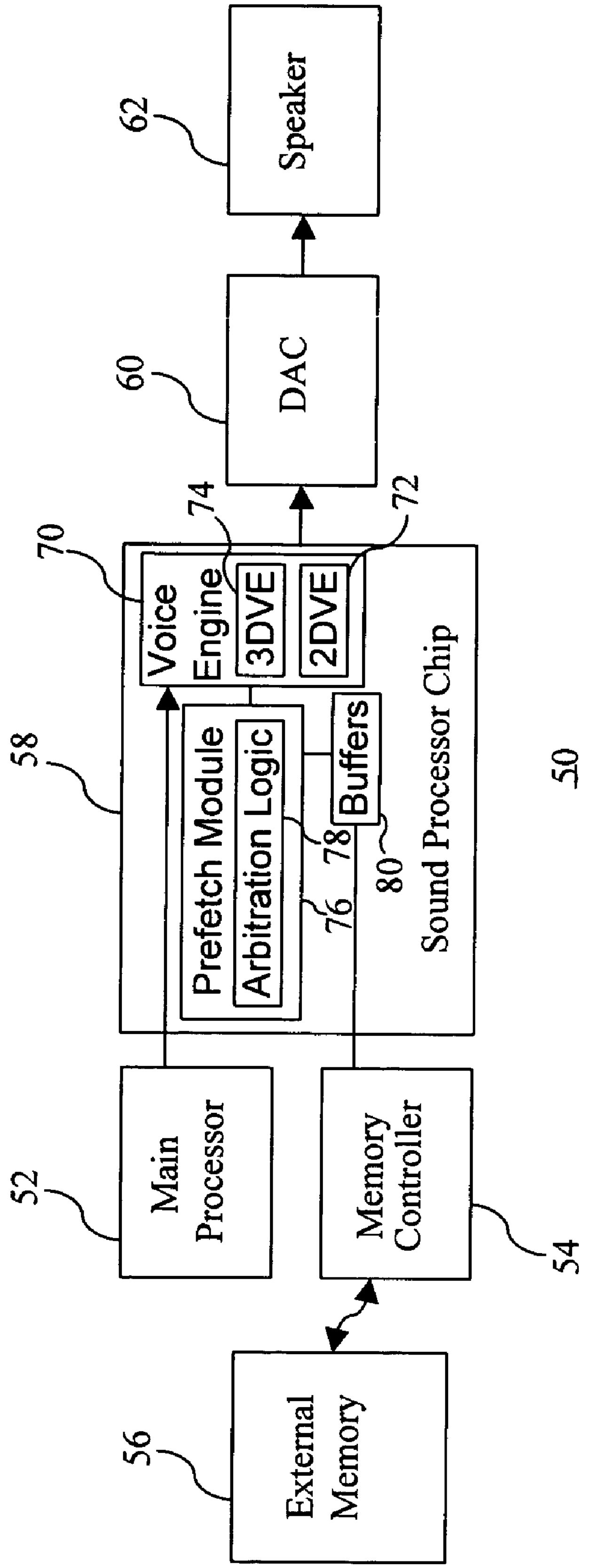
FIG. 1 Prior Art
FIG. 1 is a block diagram of a conventional sound system.
Figure 2:
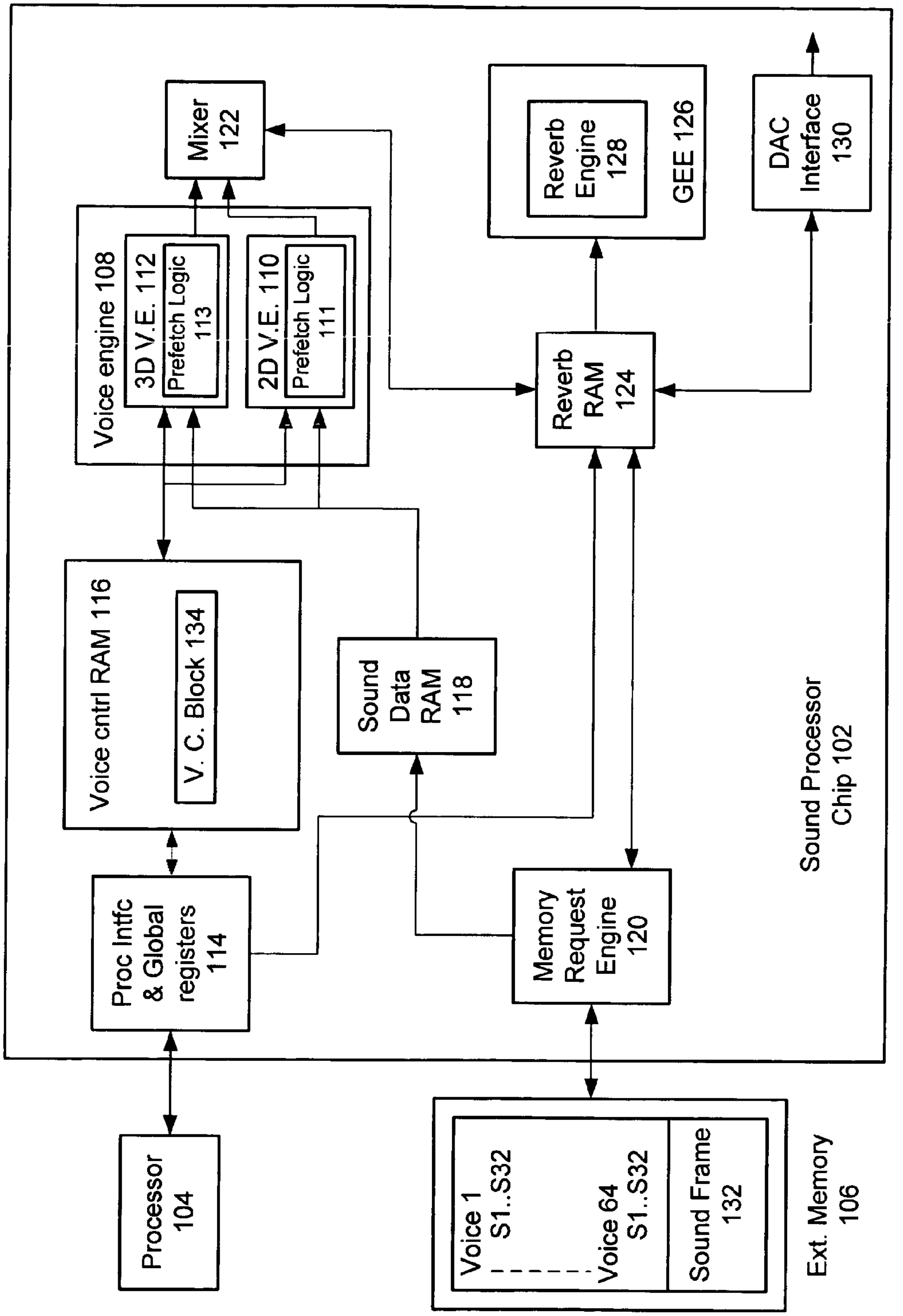
FIG. 2 is a block diagram of a sound processing system for implementing sound data prefetching, in accordance with a preferred embodiment of the present invention.

FIG. 2 is a block diagram of a sound processing system 100 for implementing sound data prefetching, in accordance with a preferred embodiment of the present invention. The sound processing system 100 includes a sound processor 102 that interacts with an external host processor 104 and an external memory 106. The sound processor 102 includes a voice engine 108, which optionally includes separate 2D and 3D voice engines (2DVE 110 and 3DVE 112). According to the present invention, the 2DVE and 3DVE include prefetch logic 111 and 113, respectively. In a preferred embodiment, the 2DVE 110 is capable of handling 48 2D voices at 24 MHz operation, and the 3DVE 112 is capable of processing 16 3D voices at 24 MHz operation. The number of 2D and 3D voice engines can vary, and the specific numbers will depend on the specific application. The sound processor chip 102 includes a processor interface and global registers 114, a voice control RAM 116, a sound data RAM 118, a memory request engine 120, a mixer 122, a reverberation RAM 124, a global effects engine 126 which includes a reverberation engine 128, and a digital-to-analog converter (DAC) interface 130.

In operation, sound data is input to the sound processor 102 from the external memory 106 as a series of sound frames 132. Each sound frame 132 comprises some number of sound samples (e.g. thirty-two), all for a given voice. The voice engine 108 processes each of the thirty-two sound samples of a sound frame 132 one at a time. The number of sound samples processed by each voice engine 110 or 112 can vary, and the specific numbers will depend on the specific application. A voice control block 134, which is stored in the voice control RAM 116, stores the settings that specify how the voice engine 108 is to process each of the sound samples.

To operate more efficiently, the sound processing system 100 prefetches sound data for the voices. According to the present invention, the sound processing system 100 integrates the prefetching of the sound data into the voice engine 108, more specifically, into the 2DVE 110 and the 3DVE 112. This eliminates the need for a separate prefetching module to be responsible for the prefetching and to be additionally responsible for monitoring multiple voice engines. The 2DVE 110 and 3DVE 112 each perform prefetching operations separately and independently utilizing their prefetch logic 111 and 113, respectively to optimize the processing of sound data. The process for prefetching is described in detail below in FIG. 4 after the more general voice processing phases are described.

Figure 3:
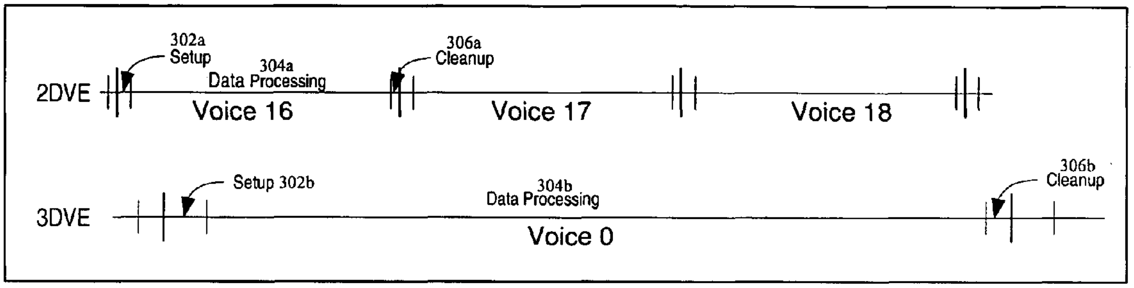
FIG. 3 is a timing diagram illustrating voice processing phases for the 2D voice engine and for the 3D voice engine of FIG. 2, in accordance with the present invention.

FIG. 3 is a timing diagram illustrating voice processing phases for the 2D voice engine 110 and for the 3D voice engine 112 of FIG. 2, in accordance with the present invention. Referring to both FIGS. 2 and 3 together, the 2DVE 110 and 3DVE 112 both have three phases for processing a voice. The first phase is the setup phase 302 (or 302*a* and 302*b*, for the 2DVE 110 and 3DVE 112, respectively). The setup phase 302 is when the voice engine 108 is set up to process the sound data for a voice. This includes reading out the control parameters set up by the host processor 104, reading out the previous state (history) of the voice from the external memory 106, and performing initial calculations that will be used for processing the sound data. The second phase is the data processing phase 304 (or 304*a* and 304*b*, for the 2DVE 110 and 3DVE 112, respectively). The data processing phase 304 is when each of the 32 sound samples for the current voice is processed in the voice engine 108. The third phase is the cleanup phase 306 (or 306*a* and 306*b*, for the 2DVE 110 and 3DVE 112, respectively). The cleanup phase 306 is when the voice processing state is stored back to the external memory 106. In a preferred embodiment, the prefetching is performed during the cleanup phase 306. As part of the cleanup phase 306, the voice engine 108 accesses the voice control block 134 of the voice for which it will prefetch data. Since the 2DVE 110 and the 3DVE 112 issue the prefetch memory requests during the cleanup phase 306, a sound data buffer that is accessed by a voice engine 110 or 112 during data processing phase 304 can thereafter be refilled with new prefetched sound data during the cleanup phase 306. The voice engine 110 or 112 then proceeds to prefetch sound data as described below.

Figure 4:
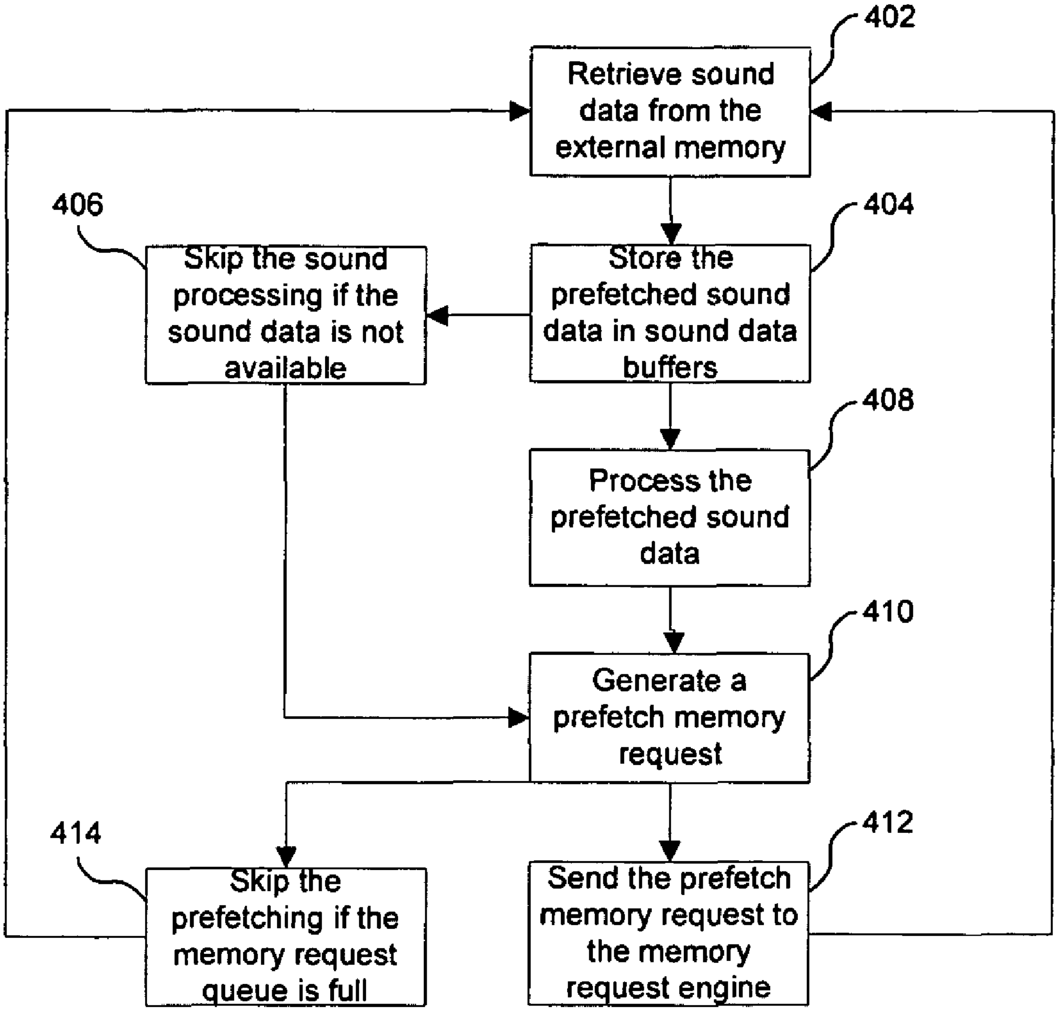
FIG. 4 is a flow diagram illustrating a process for processing sound data in the sound processing system of FIG. 2.

FIG. 4 is a flow diagram illustrating a process for processing sound data in the sound processing system 100 of FIG. 2. Referring to both FIGS. 2 and 4 together, the process begins in step 402 where the memory request engine 120 retrieves sound data from the external memory 106.

Figure 5:
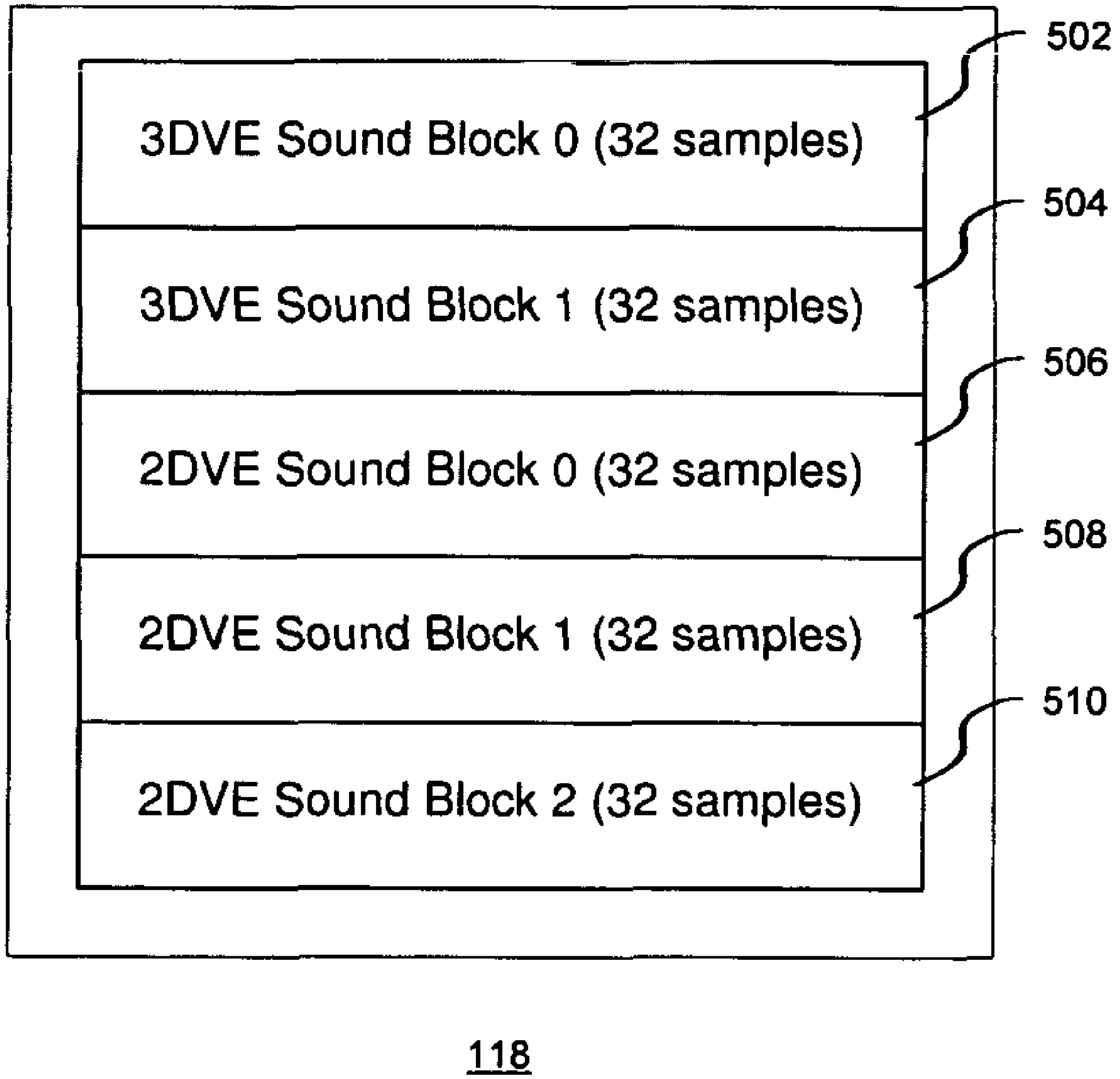
FIG. 5 is a diagram illustrating sound data buffers in the sound data RAM, in accordance with the present invention.

In step 404, the memory request engine 120 stores prefetched sound data in sound data buffers in the sound data RAM 118. FIG. 5 is a diagram illustrating sound data buffers 502, 504, 506, 508, and 510 in the sound data RAM 118, in accordance with the present invention. Each buffer includes enough space to hold 32 sound samples. One frame preferably contains 32 sound samples. The sound data buffers 502-510 correspond to voices for which sound data is processed or prefetched. The sound data buffers 506-510 are dedicated to the 2DVE 110, and the sound data buffers 502-504 are dedicated to the 3DVE 112. The specific number of sound data buffers dedicated to each voice engine and the specific number of sound samples that each sound data buffer can hold may vary, and the specific numbers will depend on the specific application.

Because there are multiple sound data buffers for each of the 2DVE 110 and the 3DVE 112, when a given sound data buffer for a given voice engine is being accessed, the other sound data buffers are available for storing incoming prefetched sound data. For example, for the 2DVE 110, if one sound data buffer is being accessed by the 2DVE 110, the other two sound data buffers are available to store new prefetched sound data. For the 3DVE 112, if one sound data buffer is currently being accessed by the 3DVE 112, the other sound data buffer is available to store new prefetched sound data.

Three sound data buffers are used for the 2DVE 110, as compared to two sound data buffers for the 3DVE 112, because the 3DVE 112 has a longer processing time per voice and can therefore tolerate a longer latency period in which a memory request completes. Because there are multiple sound data buffers for each of the 2DVE 110 and the 3DVE 112, they can perform prefetching operations separately and independently. This optimizes the processing of sound data.

Figure 6:
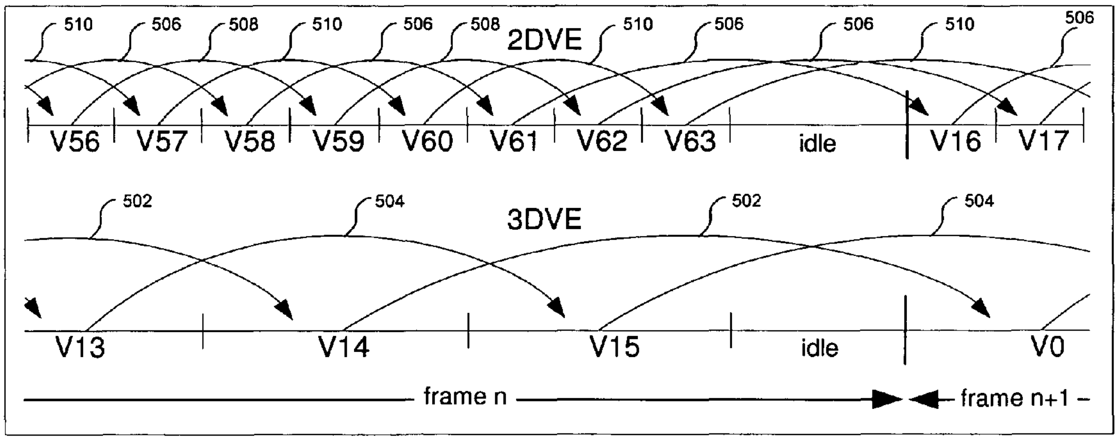
FIG. 6 is a diagram illustrating an exemplary voice prefetching sequence for 16 3D voices (voices 0-15) and for 48 2D voices (voices 16-63), in accordance with the present invention.

FIG. 6 is a diagram illustrating an exemplary voice prefetching sequence for 16 3D voices (voices 0-15) and for 48 2D voices (voices 16-63), in accordance with the present invention. Referring to both FIGS. 5 and 6 together, for a given set of voices to be prefetched, the voices are allocated among the sound data buffers in a predetermined order (e.g. sequentially), such that the sound data buffers alternate or cycle to store incoming prefetched voices. The sound data buffers alternate if there are only 2 sound data buffers and cycle if there are more than 2 sound data buffers.

Since the 2DVE 110 has 3 sound data buffers 506, 508, and 510, they cycle such that each sound data buffer will prefetch every third voice. In other words, the voice for which a sound data buffer will store prefetched sound data is the "current voice +3". For example, sound data buffer 506 will prefetch voices 16, 19, 22, . . . , 55, 58, and 61. Sound data buffer 508 will prefetch voices 17, 20, 23, . . . , 56, 59, and 62. Sound data buffer 510 will prefetch voices 18, 21, 24, . . . , 57, 60, and 63.

Similarly, since the 3DVE 112 has 2 sound data buffers 502 and 504, they alternate such that each sound data buffer will prefetch every second (i.e. every other) voice. In other works, the voice for which a sound data buffer will store prefetched sound data is "current voice +2". For example, sound data buffer 502 will prefetch voices 0, 2, 4, . . . , 10, 12, and 14. Sound data buffer 504 will prefetch voices 1, 3, 5, . . . , 11, 13, and 15. Accordingly, for a given voice engine, if there are N sound data buffers, each sound data buffer will store every Nth prefetched voice.

The 2DVE 110 and 3DVE 112 use circular math when calculating a voice number for prefetching. As such, when a voice number exceeds the maximum voice number for a given voice engine, the voice number will start again from the voice engines first voice number (e.g. voice 0 for the 3DVE 112 or voice 16 for the 2DVE 110). This simplifies the prefetching of sound data by simplifying the process of deciding which sound data buffer to use for prefetching.

FIG. 7 is a table illustrating an exemplary progression of voices in the sound data buffers 502-510 of FIG. 5, in accordance with the present invention. In the specific example, it is assumed that there are 5 3D voices (voices 0-4) and 8 2D voices (voices 16-23). The sound processor memory request engine 120 has a request port for the 2DVE 110 and a request port for the 3DVE 112. Within its internal request queues, two queue entries are allocated to the 2DVE 110 (allowing two 2DVE 110 requests to be outstanding at any time), and one queue entry is allocated to the 3DVE 112 (allowing one 3DVE 112 request to be outstanding at any time). The number of memory request queue entries allocated to each of the voice engines 110 and 112 can vary, and the specific numbers will depend on the specific application. When a voice engine request finishes, the memory request engine 120 notifies the appropriate voice engine 110 or 112.

An error may occur if the system memory latency is excessive (i.e. the sound data is not available when a voice engine needs it). The voice engines 110 and 112 handle recovery from a system memory latency error by implementing the following two simple rules. Rule 1: if the sound data for a given voice engine 110 or 112 is not available for a given voice during the setup phase 302 (FIG. 3), sound processing for that voice is not performed (i.e. sound processing is skipped, until the cleanup phase, when prefetching for the next voice is performed. Rule 2: if the memory request queues in the memory request engine 120 are full of queue entries such that a new prefetch memory request cannot be made, the voice engine 110 and/or 112 will not make a prefetch memory request (i.e. prefetching is skipped, and the voice engine will proceed with the setup phase of the next voice). Alternatively, existing memory requests could be canceled. Implementing these two rules enables the sound processing system 100 to recover when a memory latency error occurs.

For example, referring to FIGS. 4 and 7 together, if the sound data for the 2D voice 16 is not available, the 2DVE 110 will skip the sound processing of that voice in step 406, and the 2DVE 110 will be in an idle state during the data processing phase 306 (FIG. 3).

Then in the cleanup phase 306 (FIG. 3), if the memory request engine 120 queue is full for the 2DVE 110, the 2DVE 110 will skip the prefetch memory request for 2D voice 19. This is shown in step 414 of FIG. 4. In the next frame processing time slice, if the memory request engine 120 is still overloaded, sound data may not be available for 2D voice 17, and so sound processing for that voice is also skipped. If the situation persists, and the memory queue is still full, prefetching for 2D voice 20 is skipped. If the memory system overload is relieved, 2D voice 18 may be able to process sound normally, as well as prefetch data for 2D voice 21. 2D voices 19 and 20 will skip sound processing, because their data was never requested. But, the 2DVE 110 will be able to prefetch sound data for 2D voice 22 and 23. Sound processing can continue normally from 2D voice 21 and so on.

The prefetching scheme of the present invention is easily extendible to more than two voice engines. This prefetch scheme allows all newly made memory requests to have the same latency requirement. In essence, skipping sound processing because of unavailable data prevents a voice engine from processing erroneous sound data, and skipping sound data prefetching allows the memory request queue to catch up.

As sound data is prefetched, the 2DVE 110 and 3DVE can proceed to process the prefetched sound data in step 408. During processing of the sound data, the contents of the voice control block 134 (FIG. 2) may be altered by a high-level program (not shown) running on the host processor 104. The processor interface 114 accepts the commands from the host processor 104, which are first typically translated down to AHB bus protocol.

While the voice engine 108 (more specifically, the 2DVE 110 and/or the 3DVE 112) is currently working on a voice (e.g. voice 16) in step 408, during the clean up phase **306*a* (FIG. 3) of step 408, the memory request engine 120 is concurrently handling one or more prefetch memory requests that the voice engine 108 previously generated in step 410. A prefetch memory request is an instruction to retrieve sound data from the external memory 106 and to store the retrieved/prefetched sound data in the sound data RAM 118. Once stored in the sound data RAM 118, the prefetched sound data is available for processing during a subsequent data processing phase 304 (FIG. 3). As such, in step 412, the voice engine 108 sends the prefetch memory request to the memory request engine 120**.

Note that the voice engine 108 will continue with the setup phase **302*a* of a given voice (e.g. voice 16+1) in step 408 while the prefetched sound data for voice 16+N is retrieved and stored in steps 410 and 412** in the background, which is the basis for prefetching.

After the 3D and 2D voice engines 110 and 112 process the sound samples, the values are then sent to the mixer 122, which maintains different banks of memory in the reverb RAM 124, including a 2-D bank, a 3-D bank and a reverb bank (not shown) for storing processed sound. After all the samples are processed for a particular voice, the global effects engine 126 inputs the data from the reverb RAM 124 to the reverb engine 128. The global effects engine 126 mixes the reverberated data with the data from the 2-D and 3-D banks to produce the final output. This final output is input to the DAC interface 130 for output to a DAC to deliver the final output as audible sound.

According to the system and method disclosed herein, the present invention provides numerous benefits. For example, it provides an efficient architecture, which eliminates the need for a separate prefetch module to monitor multiple voice engines. Embodiments of the present invention also simplify decision making of which sound data buffer to use for prefetching. Embodiments of the present invention also provide a simple and robust method of recovery from excess system memory latency.

A system and method for prefetching sound data in a sound processing system has been disclosed. The present invention has been described in accordance with the embodiments shown. One of ordinary skill in the art will readily recognize that there could be variations to the embodiments, and that any variations would be within the spirit and scope of the present invention. For example, the present invention can be implemented using hardware, software, a computer readable medium containing program instructions, or a combination thereof. Software written according to the present invention is to be either stored in some form of computer-readable medium such as memory or CD-ROM, or is to be transmitted over a network, and is to be executed by a processor. Consequently, a computer-readable medium is intended to include a computer readable signal, which may be, for example, transmitted over a network. Accordingly, many modifications may be made by one of ordinary skill in the art without departing from the spirit and scope of the appended claims.

I claim:

1. A sound processing system, comprising:

a 3-D voice engine to receive, from a voice control RAM, a voice control block that specifies how said 3-D voice engine is to process each of a first plurality of sound samples, each of said first plurality of sound samples received by said 3-D voice engine using first prefetch logic integrated into said 3-D voice engine, said first prefetch logic performing prefetch operations, said prefetch operations including sending an instruction to retrieve sound data from an external memory and store the retrieved sound data in a sound data RAM; and, a 2-D voice engine to receive, from said voice control RAM, a voice control block that specifies how said 2-D voice engine is to process each of a second plurality of sound samples, each of said second plurality of sound samples received by said 2-D voice engine using second prefetch logic integrated into said 2-D voice engine, said second prefetch logic performing prefetch operations separately and independently from said first prefetch logic.

2. The sound processing system of claim 1 wherein when said first plurality of sound samples is not available during a setup phase of said 3-D voice engine, sound processing for a first voice associated with said first plurality of sound samples is not performed, and when said second plurality of sound samples is not available during a setup phase of said 2-D voice engine, sound processing for a second voice associated with said second plurality of sound samples is not performed.

* * * * *